United States Patent [19]
Leong et al.

[11] Patent Number: 5,674,415
[45] Date of Patent: Oct. 7, 1997

[54] METHOD AND APPARATUS FOR REAL TIME WELD MONITORING

[75] Inventors: Keng H. Leong, Lemont; Boyd V. Hunter, Bolingbrook, both of Ill.

[73] Assignee: The University of Chicago, Chicago, Ill.

[21] Appl. No.: 589,857

[22] Filed: Jan. 22, 1996

[51] Int. Cl.$^6$ .................................................. B23K 26/04
[52] U.S. Cl. ............................ 219/121.83; 219/121.63; 219/121.64
[58] Field of Search ........................ 219/121.83, 121.63, 219/121.64, 130.01, 124.34, 130.21

[56] References Cited

U.S. PATENT DOCUMENTS

| | | | |
|---|---|---|---|
| 3,627,972 | 12/1971 | Iceland et al. | 219/130.21 |
| 4,594,497 | 6/1986 | Takahashi et al. | 219/130.21 |
| 4,975,558 | 12/1990 | Lukens et al. | 219/124.34 |
| 5,155,329 | 10/1992 | Terada et al. | 219/121.83 |
| 5,486,677 | 1/1996 | Maischner et al. | 219/121.83 |

FOREIGN PATENT DOCUMENTS

| | | |
|---|---|---|
| 3-60882 | 3/1991 | Japan . |
| 95/09713 | 4/1995 | WIPO . |

OTHER PUBLICATIONS

Product brochure entitled "On–line monitoring of the degree root penetration during laser beam welding", dated 1992, published by Fraunhofer, Aachen, Germany.

Product brochure entitled "Modular Process Control System (MPC)", dated 1993, published by Fraunhofer, Aachen, Germany.

Product brochure entitled "SyncroVision—For Pulsed Laser Welding", undated, published by Control Vision, Idaho Falls, ID.

Product brochure entitled "LaserStrobe", undated, published by Control Vision, Idaho Falls, ID.

Chen, H. B., Li, L., Brookfield, D. J., Williams, K., Steen, W. M. (1991) Laser Process Monitoring with Dual Wavelength Optical Sensors. Proceedings ICALEO pp. 113–122.

Chung, D. U. (1994) Monitoring Laser Weld Quality in Real Time. Industrial Laser Review. Nov., 15–16.

Ducharme, R., Kapadia, P. (1993) The Collapse of the Keyhole in the Laser Welding of Materials. Proceedings ICALEO, 177–183.

Dymshakov, A. M., Dykhne, F. V., Lebedev, Pis'mennyi, Z. D., Rysev, B. P. (1988) Excitation of large–Amplitude surface Acoustic Waves by a Moving Laser Beam, vol. 52, No. 9, Investiya Akademii Nauk SSSR.

Farson, D. F., Fang, K. S., Kern, J. (1991) Intelligent laser Welding Control. Proceedings ICALEO, 104–112.

Farson, D., Hillsley, K., Sames, J., Young, R. (1994) Frequency–Time Characteristics of Air–Borne Signals from Laser Welds. Proceedings ICALEO pp. 86–104.

(List continued on next page.)

*Primary Examiner*—Geoffrey S. Evans
*Attorney, Agent, or Firm*—Mason, Kolehmainen, Rathburn & Wyss

[57] ABSTRACT

An improved method and apparatus are provided for real time weld monitoring. An infrared signature emitted by a hot weld surface during welding is detected and this signature is compared with an infrared signature emitted by the weld surface during steady state conditions. The result is correlated with weld penetration. The signal processing is simpler than for either UV or acoustic techniques. Changes in the weld process, such as changes in the transmitted laser beam power, quality or positioning of the laser beam, change the resulting weld surface features and temperature of the weld surface, thereby resulting in a change in the direction and amount of infrared emissions. This change in emissions is monitored by an IR sensitive detecting apparatus that is sensitive to the appropriate wavelength region for the hot weld surface.

9 Claims, 12 Drawing Sheets

OTHER PUBLICATIONS

Gu, H., Duley, W. W. (1994) Acoustic Emission and Optimized $CO_2$ Laser Welding of Steel Sheets. Proceedings ICALEO pp. 77–85.

Hoffman, T. (1991) Real–Time Imaging for Process Control. Advanced Materials & Processes, vol. 140, No. 3, 37–43.

Jon, M. C. (1985) Noncontact Acoustic Emission Monitoring of Laser Beam Welding. Welding Journal, Sep., 43–48.

Li, L., Steen, W. M., Shi, K., Brookfield, D. J. (1992) Sensor Development for In-process Quality Inspection and Optimization of High Speed Laser Can Welding Process, Proceedings of LAMP '92, Jun., Nagaoka, Japan.

Li, L., Steen, W. M. (1992) Non–contact Acoustic Emission Monitoring During Laser Processing. Proceedings ICALEO, 719–728.

Maischner, D., Drenker, A., Seidel, B. Abels, P., Beyer, E. (1991) Process Control During Laser Beam Welding. Proceedings International Congress on Applications of Lasers and Electro–Optics, 150–155.

Mazhukin, V. I., Gusew, I. V., Smurov, I., Flamant, G., (1993) Kinetics of Laser Plasma Formation in Metal Vapour. Proceedings ICALEO pp. 213–223.

Saifi, M. A., Vahaviolos, S. J. (1976) Laser Spot Welding and Real–Tiume Evaluation. Journal of Quantum Electronics, Feb., vol. QE–12, No. 2, 129–136.

Schnars, U., Sepold, G., Juptner, W. P.(1992) Quality Assurance of Laser Beam Welding by Evaluation of Plasma–Density–Fluctuations. Proceedings 25th International Symposium on Automotive Technology and Automation, Florence, Italy, June.

Schou, C. E., Semak, V. V., McCay, T. D.(1994) Acoustic Emission at the Laser Weld Site as an Indicator of Weld Quality. Proceedings ICALEO pp. 41–50.

Williams, K., Steen, W. M., Ducharme, R., Kapadia, P., Dowden, J. (1993) On Laser Welding Meltpool Dynamics. Proceedings ICALEO pp. 168–176.

Beyer, E., Maischner, D., Kratzsch, C. (1994) A Neural Network to Analyze Plasma Fluctuations with the Aim to Determine the Degree of Full Penetration in Laser Welding. Proceedings ICALEO, 51–57.

Bull, C. E., Calcraft, R., Stacey, K. A. (1993) On–Line Weld Monitoring Using Ultrasonics British Journal of NDT. Feb. vol. 35, No. 2, 57–64.

Carlson, N. M., Johnson, J. A., Larsen, E. D., Smartt, H. B., Taylor, P. L., Waddoups, M. A., Watkins, A. D. (1992) Sensing the Gas Metal Arc Welding Process Idaho National Engineering Laboratory Technical Report #EGG–M—92101.

Abels, P., Beyer, E., Drenker, A., Kaierle, S., Kirby, C. and Nitsch, H. (1995) Process Control for Laser Materials Processing. Automotive Laser Applications Workshop, Mar. 6–7, Dearborn, MI.

Aspects for Quality Assurance with a Plasma Monitoring System During Laser Beam Welding. Thyssen Laser Technik GMBH Technical Report.

Bagger, C., Miyamoto, I., Olsen, F. and Maruo, H. (1991) On–line Control of the $CO_2$ Laser Welding Process. DVS Berichte, 135, 1–6, Beam Technology. Proceedings, Conference, Karlsruhe, Germany, 13–14 March.

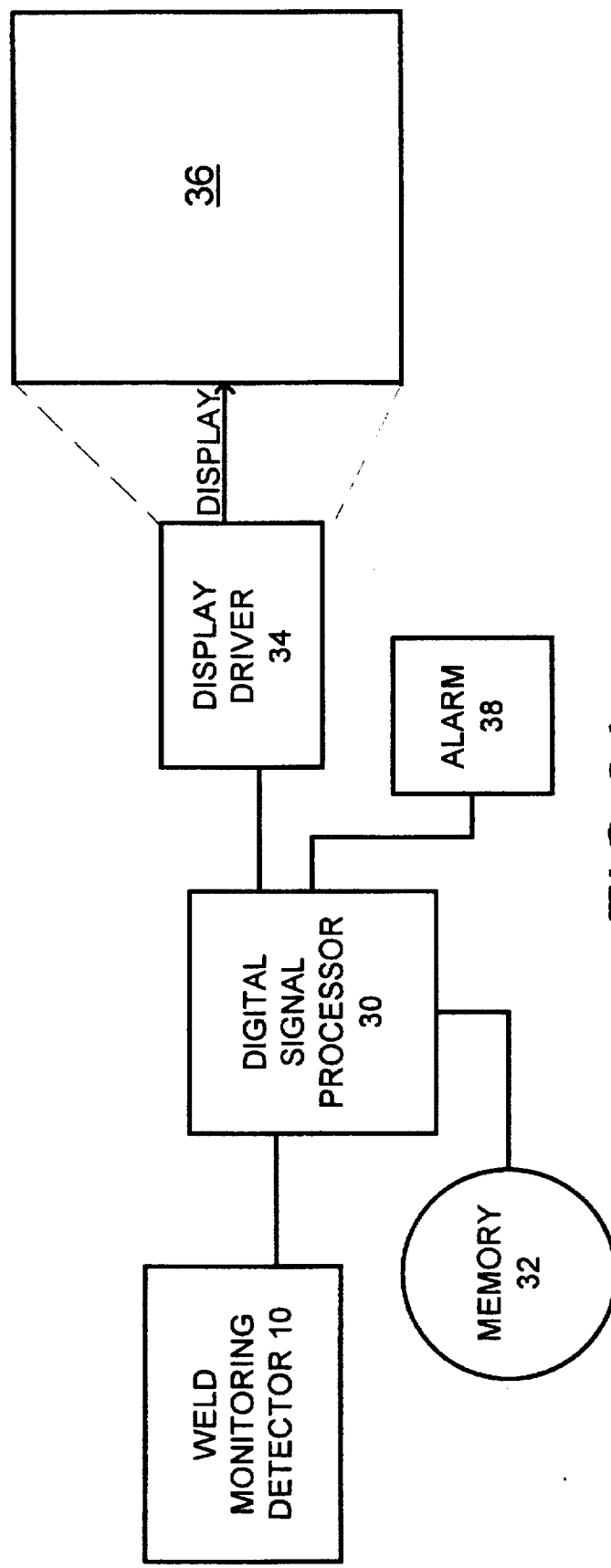

METHOD AND APPARATUS FOR REAL TIME WELD MONITORING

CONTRACTUAL ORIGIN OF THE INVENTION

The United States Government has rights in this invention pursuant to Contract No. W-31-109-ENG-38 between the United States Government and Argonne National Laboratory.

BACKGROUND OF THE INVENTION

1. Field of the Invention

The present invention relates to an improved method for weld monitoring, and more particularly to an improved method and apparatus for real time monitoring of an infrared (IR) signature of a weld pool to identify a predetermined weld parameter, such as, a weld pool depth, utilizing an infrared (IR) detector.

2. Description of the Prior Art

Monitoring and control of the welding process is important to the production of a quality product. Laser welding in the keyhole mode is normally used to produce high aspect ratio weld joints at high speed with low heat input and distortion to the rest of the workpiece. This type of welding is called keyhole because of the geometry formed in the weld area of metal as it is being welded. A plasma is formed from the interaction of the intense laser beam with a shield gas and the metal atoms vaporized from the molten pool. Spectral emissions of the plasma are concentrated in the ultraviolet (UV) and visible wavelengths, whereas infrared (IR) radiation is characteristic of the hot molten pool. The intensity of the plasma is affected by the ionization potential and the aerodynamics of the shield gas. For example, helium with its higher ionization energy will tend to produce a less intense plasma than argon. The plasma absorbs the laser beam energy and affects the coupling of the laser beam to the weld pool. The plasma intensity is a power function of the wavelength of the laser beam. A $CO_2$ laser (10.6 µm) beam will produce a more intense plasma than a Nd:YAG laser (1.06 µm) beam, where plasma problems are usually not very significant. In $CO_2$ laser welding, cross jet systems are often used to minimize the plasma and improve coupling of the beam to the workpiece.

Laser beam welding also produces a characteristic acoustic emission, a buzzing sound or timbre well known to experienced welders, when there is good coupling of the workpiece. These characteristic photonic and acoustic emissions during keyhole laser welding are affected by the process parameters of beam power and intensity, shield gas, geometry and material properties.

A variety of known sensors are used to monitor emissions produced by keyhole laser beam welding. Photodiodes and thermal detectors are used to detect emissions from ultraviolet to infrared. Acoustic sensors or microphones can be used to detect sound from the keyhole welding. In addition to the various sensors, camera systems have been utilized to visually monitor the size and shape of the weld pool, but visual observation of the weld pool is hard to correlate to weld quality.

Infrared pyrometry is an effective nonintrusive method to sense temperature. This method however, senses only temperature and does not provide any information on the width or shape of the weld surface. Temperature sensing will only detect abnormalities when there is a substantial change in the temperature such as when there is a loss in beam power. Other known commercial acoustic sensors are available which have been shown to work well in the laboratory. However, on the shop floor, where there is a great deal of other noise and hostile environment surrounding the welding area, acoustic monitoring is compromised. The plasma formed during laser welding of metal emits a spectra that is characteristic of the shield gas used and the vaporized metal atoms from the alloy being welded. The intensity of the radiation tends to be concentrated in the UV and visible spectrums. Monitoring of the condition or stability of the plasma is normally obtained using UV photodiodes with a fast response. The time-varying intensity of the UV radiation is monitored, but there are concerns about the coupling of the plasma to the weld itself. Alternatively, the hot molten pool emits a strong IR signal that can easily be monitored by IR photodetectors, but has only been correlated with surface features. None of the above described known systems provide a satisfactory method of real time weld monitoring for use on the shop floor and that can be operated by a technician with a minimum of training.

Known sensors suitable for detecting signals from the welding process are summarized in TABLE 1. The responsivity or bandwidth listed for each sensor is suited for the monitoring of different signal sources in the laser welding process. A number of parameters impact the practicality of each detection or monitoring scheme. The relative performance of the sensors listed in TABLE 1 is indicated in TABLE 2. The cost of the sensor and accessories required also should be considered. The complexity of the sensing methodology will impact on the ruggedness and success of the monitoring technique. The configuration of the system, the number of components, when filters and additional sources for illumination may be required, also are constrained by the factory environment.

TABLE 1

| Sensor | Bandwidth (µm) | Signal Source |
|---|---|---|
| GaP Photodiode | 0.19–0.52 | plasma |
| Ge photodiode + Si filter | 1.0–1.9 | molten pool |
| InGaAs photodiode | 0.8–1.7 | molten pool |
| Thermal disk, thermopiles | UV-IR | all radiant sources |
| microphone | 0–20KhZ | keyhole |
| CCD camera | UV-near IR | weld process |
| IR camera | IR | hot material |

TABLE 2

Relative performance of sensors suitable for monitoring the welding process

| Sensor | Cost | Complexity | Data Processing |
|---|---|---|---|
| GaP Photodiode | low | low | low |
| Ge photodiode + Si filter | low | low | low |
| InGaAs photodiode | low | low | low |
| Thermal disk | low | low | low |
| Microphone | low | low | medium |
| CCD camera | medium | high | high |
| IR camera | high | high | high |

Reliability under adverse conditions of temperature, humidity, and environment also should be considered. Most of the above listed sensors capture radiant energy from the weld process. Consequently, windows need to be kept clean from ambient aerosols and splatter from the weld pool. This is usually achieved with a particle-free, dry gas purge used together with a mechanical shroud design. In addition, pointing accuracy and stability are required for reliable sensing. The photodiode sensors, thermal detectors and microphone are relatively low cost as compared to CCD cameras. Additional costs are incurred with required illumination techniques with lasers or strobes and filters. IR cameras are the most expensive but do not require illumination or filters for examining the weld pool since the detector array is not sensitive to the plasma. Also camera systems produce an enormous amount of data and computerized vision capabilities are expensive and not very practical at the current level of technology. However, simplified vision systems using CCD cameras have been used for seam tracking and weld width monitoring.

CCD camera systems can be configured to provide vision data on the welding process. In particular, with the use of filters and external illumination (lasers or strobes) the blinding effect of the plasma can be overcome and a relatively clear picture of the weld being formed and the weld pool can be obtained. These systems are particularly useful for troubleshooting where direct viewing of the weld process is necessary to determine the cause of a particular problem. For example, when wire feeding is used, the ability to see the wire, its location and the melting process is crucial. For complex weld geometries, a clear view of the weld process is also very useful in troubleshooting.

An alternative to using a CCD camera is the higher cost IR camera that is sensitive to the hot weld pool but insensitive to the plasma. This type of IR camera uses platinum silicide or mercury cadmium telluride (MCT) sensing arrays that require cooling for efficient sensing. Filters and external illumination are not required since the array senses the intensity of IR emissions. This passive sensing method, although simpler to use, is not as flexible as the CCD camera system with external illumination that can be used to control the brightness and produce stop action sequences.

Camera or vision systems, although ideal for troubleshooting, are not generally appropriate for indicating the quality of the weld. Although feasible, the enormous amount of data generated requires complex and rapid processing. Special systems have been devised to overcome this handicap to real time weld monitoring. Seam tracking and seam width can be obtained by using an external laser (line) source to illuminate the weld or seam. The data obtained by the CCD cameras of the reflected beam is then analyzed. The surface features can be determined with the aid of an expert system. The additional complexity in attempting to interpret the data for weld surface features increases the cost and impairs marketability of such a monitoring system.

The hot molten pool produced during welding has a characteristic temperature that is affected by the process parameters in addition to the metal properties. The temperature range is between the melting and boiling temperatures of a particular metal. For a particular weld process, when a good weld is produced and the process parameters are invariant, the temperature of the molten pool will tend to be relatively constant. Variations at the start and end of the weld can be expected and when the workpiece metal thickness changes, varying the heat sink. Infrared (IR) pyrometry is a particularly efficient method to sense temperature noninstrusively. This sensing method is based on the change in IR emissions of a body with temperature. The spectra of the radiation emitted by a body is determined by its emissivity. The peak intensity of this spectrum is a function of the temperature and the associated wavelength decreases with temperature. IR sensors and filters are used for maximum sensitivity at different temperature ranges. For example, a MCT detector, or a thermopile detector with filter, may be used to sense the radiation in the 8 to 14 µm region for temperatures less than 800° C, whereas a photodiode sensitive to the 1 µm wavelength may be more appropriate for high temperature applications. A fiberoptic cable can be used for near IR wavelengths when the sensor needs to be positioned in a less demanding environment.

IR pyrometry senses temperature only and does not provide information on the width of the weld. Temperature sensing normally will detect abnormal conditions when there is a substantial decreased speed, which causes a temperature increase. Surface features may be detected if, for example, humps cause a change in surface temperature.

Many researchers have examined the acoustic signals generated during welding to determine their suitability as indicators of the quality and penetration of the weld. In steady state, the primary source of the acoustic signals is the vapor emissions into the keyhole from the molten metal. The spectrum of the acoustic signals tends to change with a higher intensity beam that generates a deeper keyhole. Other phenomena such as plasma ignition and workpiece surface features also affect acoustic signals. When full penetration is achieved, the vapor has another route to escape through the bottom of the weld and a change in the acoustic signal results. The positioning of the detector is also important since the strength of the acoustic signal decreases inversely with the square of the distance from the source to the acoustic detector.

Since the acoustic signals are affected by the power and intensity of the beam and the material and geometry of the workpiece, the acoustic spectrum needs to be monitored. For a particular setup, the presence of full penetration may be indicated by the intensity of the signal in a particular bandwidth or the quality of the weld may be indicated by a characteristic spectra. Due to the variability of these effects and the number of parameters, neural networks have been used to analyze acoustic signals to indicate defective welds.

The acoustic sensing method is still in the development stage but good results have been obtained in the laboratory environment. In a factory floor environment, acoustic interferences from mechanical noises for various sources would be expected and would impair the performance of even well trained neural networks to intelligently distinguish a bad weld from the many interfering and transient background acoustic noises. A typical spectrum of the background noise may exist and acoustic sensing may perform well if the signal-to-noise ratio is robust. The robustness of the sensor in the manufacturing environment also must be considered.

A variation of the acoustic sensing method described above is the acoustic technique that has been used to carry out post-weld evaluation. A laser beam can be used to excite the weld immediately after it is formed. An acoustic transducer can be used to obtain the signals produced from the excitation to determine weld quality. Complications in coupling for a moving workpiece result with using a standard acoustic transducer. One solution, albeit complex, is the use of nonintrusive techniques such as another laser beam to sense the vibrations produced at the surface.

UV detection has been used with the plasma formed during laser welding of a metal which emits a spectra that is characteristic of the shield gas used and the vaporized metal atoms present in the alloy being welded. The intensity of the radiation tends to be concentrated in the UV and visible regions. Monitoring of the condition or stability of the plasma is normally obtained using UV photodiodes with fast response time, typically less than 0.1 ms. The time-varying intensity of the UV radiation is monitored. Fast Fourier Transforms are used to analyze the spectrum of the signals under different weld conditions. A good weld is characterized by a particular spectrum whereas an abnormal condition is indicated by a change in the intensity of part of the spectrum. As in acoustic sensing, the principle of analysis and correlation with weld quality is similar and full penetration of the weld can be detected by monitoring above the weld. Thermal or IR detectors can be used to easily detect the presence of full penetration if the detector can be located on the underside of the weld; however, this is frequently inaccessible.

Neural networks have been used with a UV monitoring system to identify a threshold level where a weld is identified as a bad weld. Neural networks have been tested in an auto welding application by the Fraunhofer Institute for Laser Technology, in Aachen, Germany. A high probability of detecting full penetration welding and of detecting a gap wider than 0.2 mm have been achieved. Acoustic sensing would be expected to have a similar degree of reliability but subject to the presence of background noise on a factory floor. However, it should be noted that retraining of the neural network must be performed for each application and the above described level of success of the UV monitoring system was achieved with highly trained scientists and engineers who developed the system. A somewhat similar UV monitoring system without the benefit of a neural network has been available through Weidmuller Sensor Systems of McHenry, Ill., U.S.A.

W. Steen's group at the University of Liverpool, England, has shown that increased fault sensing can be obtained by using both plasma and acoustic sensing with an expert system. There a plasma charge sensor and acoustic emission nozzle were used.

It is an object of the present invention to provide an improved method for weld monitoring.

It is another object of the present invention to provide such an improved method that provides real time monitoring of an infrared (IR) signature of a weld to identify a predetermined weld parameter, such as, weld penetration.

It is another object of the present invention to provide such an improved method that provides real time monitoring of an infrared (IR) signature of a weld to identify a predetermined weld parameter, such as, weld surface feature.

It is another object of the present invention to provide such an improved method that utilizes an infrared (IR) detector and that provides reliable and effective operation.

It is another object of the present invention to provide such an improved method and improved monitoring system providing robust results in that the number of good welds tagged as bad is minimized and where the system is relatively simple to operate without requiring elaborate training or adjustments.

It is another object of the present invention to provide such an improved method and system that overcomes many of the disadvantages of prior art arrangements.

SUMMARY OF THE INVENTION

In brief, these and other objects and advantages of the invention are provided by an improved method and apparatus for real time weld monitoring. An infrared signature emitted by a hot weld surface during welding is detected and this signature is compared with an infrared signature emitted by the weld surface during steady state conditions. The result is correlated with weld penetration. Changes in the weld process, such as changes in the transmitted laser beam power, quality or positioning of the laser beam, change the resulting weld surface features and temperature of the weld surface, thereby resulting in a change in the direction and amount of infrared emissions. This change in emissions is monitored by an IR sensitive detecting apparatus that is sensitive to the appropriate wavelength region for the hot weld surface.

BRIEF DESCRIPTION OF THE DRAWINGS

The present invention together with the above and other objects and advantages may best be understood from the following detailed description of the preferred embodiments of the invention illustrated in the drawings, wherein:

FIG. 3A is a block diagram representation of a monitoring system including the detector of FIG. 1 arranged in accordance with the present invention;

DETAILED DESCRIPTION OF THE PREFERRED EMBODIMENT

Figure 2:
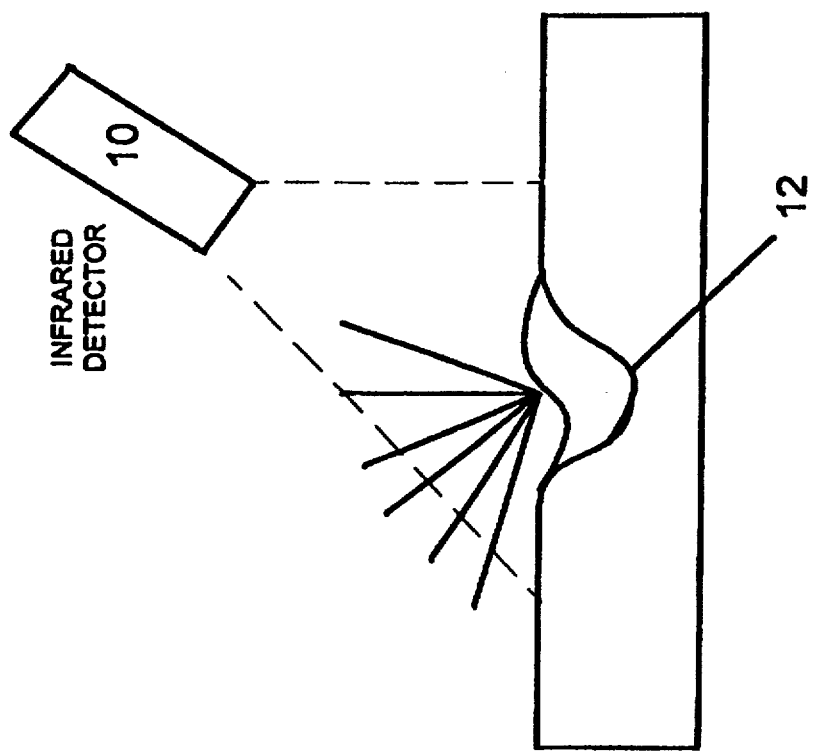
FIG. 2 is a schematic representation similar to FIG. 1 illustrating a bad weld.
Figure 1:
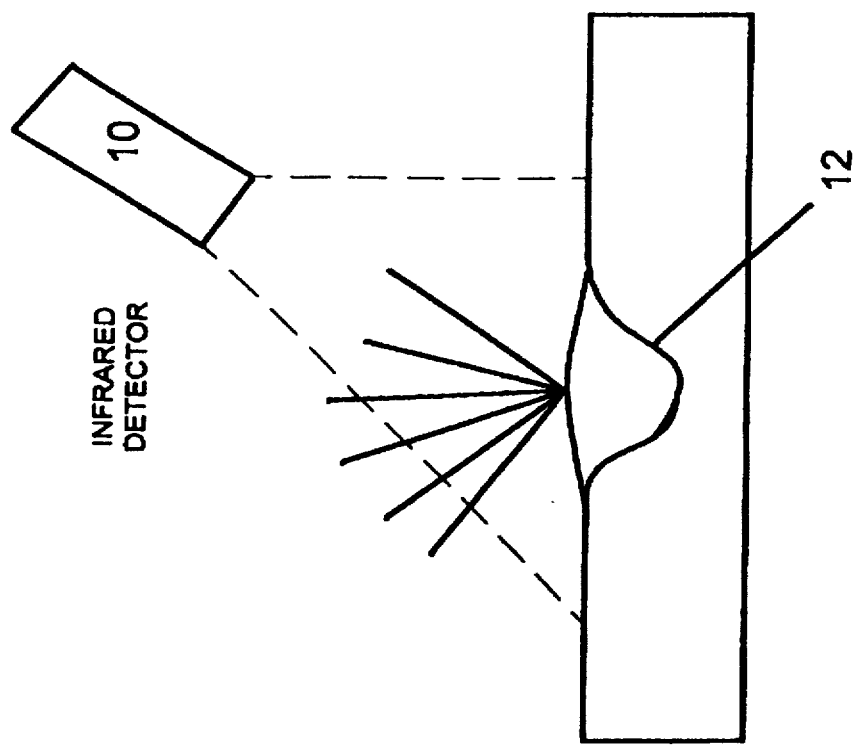
FIG. 1 is a schematic representation of a weld to be monitored and a detector in accordance with the present invention.
Figure 3:
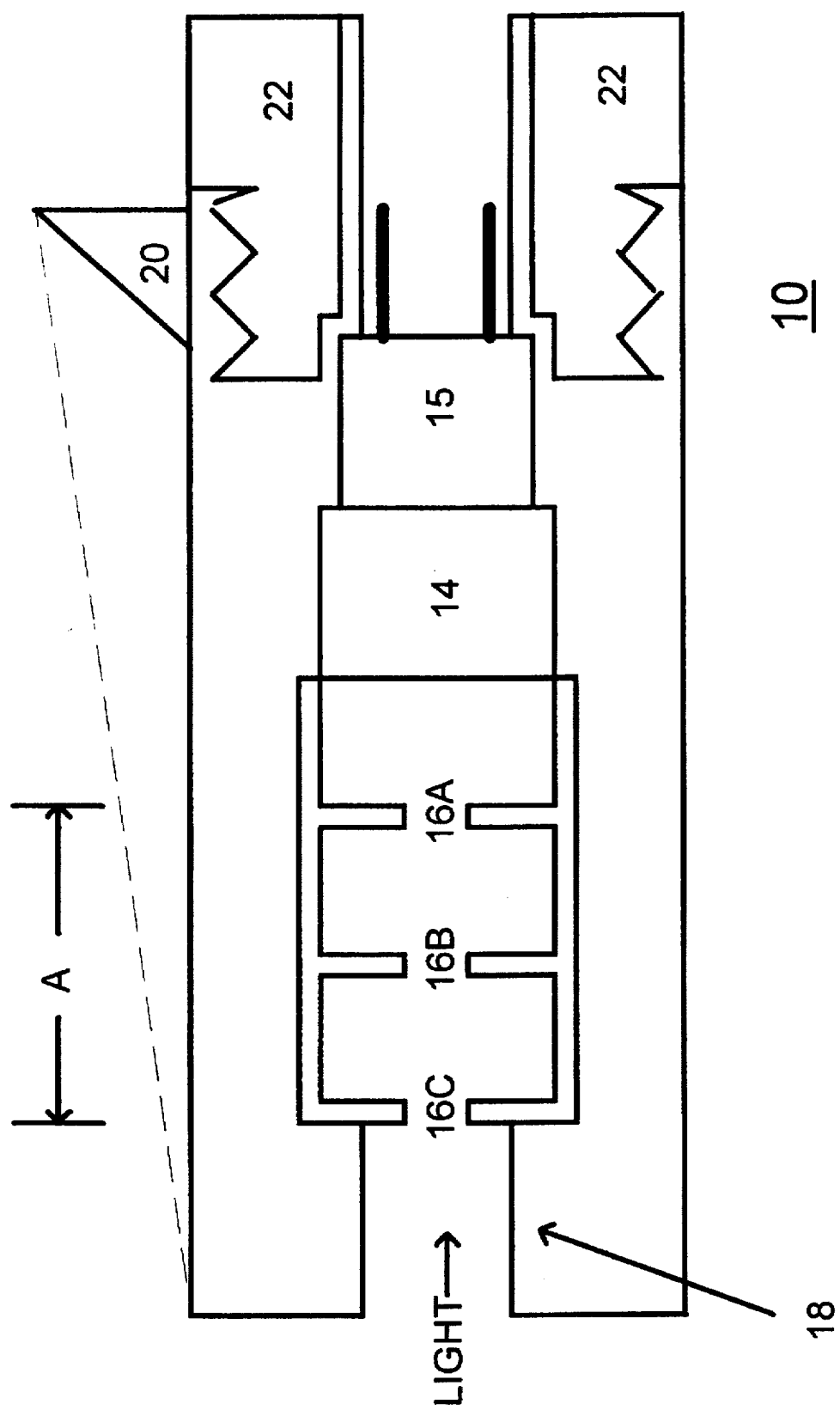
FIG. 3 is a more detailed schematic representation of the detector of FIG. 1 in accordance with the present invention.

Having reference now to the drawings, in FIGS. 1, 2 and 3 there is shown a detector or sensor generally designated by the reference character 10 in accordance with the invention. The detector 10 monitors an infrared (IR) signature of a weld or molten weld pool 12. The hot molten weld pool 12 emits an infrared (IR) signal that is detected by an IR photodetector 14 of the detector 10. An alternating current (AC) intensity of the near IR (0.8–1.5 μm) signals provides an excellent indicator of the weld surface condition. The direct current (DC) magnitude of the detected signal indicates the penetration of the weld 12. The IR emissions detected by detector 10 are substantially controlled by the temperature and area of the surface of the weld pool 12 including the intense plasma in the keyhole of the weld 12.

In accordance with a feature of the invention, monitoring of the weld pool 12 is based on an assumption that a unique or invariant signature is characteristic of a good weld. Variations in the process parameters, such as beam power or traverse speed, that may impair the quality of a weld change the monitored IR emissions detected by the IR detector 10. For invariant conditions, the output signal of the sensor 10 is essentially constant. Otherwise, the signal received by the detector 10 varies with the emitting surface changes in geometry of the weld pool 12. Changes in weld width, humping or undercut will result in variations in output of the detector 10. However, it should be understood that the power received by the IR sensor 10 is not a unique function of the weld surface geometry. The absolute value of the power received is a function of the distance or separation of the detector 10 from the weld 12 and the field of view of the detector 10 in addition to weld surface features and temperature. Relative changes in detector output signal indicate a change in the weld process for a fixed detector position, absolute output signal values are calibrated to indicate changes in a weld parameter, such as weld width. Higher irradiance produced by the laser beam is required for deeper weld penetration. This higher irradiance produces a hotter weld pool emitting higher intensity IR signals that causes an increase in the detector output signal.

Monitoring the infrared signature from the weld pool 12 provides a more direct method of monitoring the surface features of the weld, and of weld quality as compared to the monitoring of the plasma or the acoustic emissions. It may be understood that monitoring the signatures or emissions produced by the welding process is only a qualitative indication of the weld quality. Changes in the weld process, such as changes in the transmitted laser beam power, quality or characteristics, positioning, will tend to change the surface features of the weld pool in terms of the width and shape, thereby resulting in a change in the direction and amount of infrared emissions. This overall change in IR emissions is monitored by the IR photodiode 14 which is sensitive to the appropriate wavelength region of the IR emissions. By sensing the IR emissions only, the cause of the change may not be determined but the change will certainly be detected. It should be noted that a similar problem is encountered in using UV or acoustic sensing techniques so that it may be difficult to properly discriminate a bad weld from a good one. However, the level of data processing is less complex and the degree of difficulty in discrimination may be correspondingly lower using the IR detector 10 of the invention.

As shown in FIG. 1, detector 10 has a particular field of view for the collection of the infrared emissions from the weld 12. In use, the detector 10 is pointed such that the field of view covers more than the width of the weld 12 to allow for aiming inaccuracies. FIG. 1 illustrates that part of the IR emission collected by the detector 10 for the case of the good weld. A poor quality weld 12 as illustrated in FIG. 2 has a surface such that most of the emissions are pointed away from the detector 10 resulting in a decrease in the sensor output. The configuration of the detector's field of view and the geometry of the weld surface is such that the sensor output will be affected by the angular position of the detector. Mounting positions near normal or less than 45° from normal are more sensitive to most weld surface changes compared to lower elevations.

Referring to FIG. 3, the weld monitoring detector 10 includes the IR photodiode 14 mounted in a collimator, as shown. An important feature of the weld monitoring detector 10 is that the photodiode 14 is located far back in the device both for protection from splatter and to limit the area sensed to the approximate area of the width of the weld 12. The photodiode 14 is operated in a photovoltaic mode providing output voltage proportional to the power received. An integrated circuit (IC) socket 15 mounts the IR photodiode 14. The field of view of the detector 10 is restricted by the three collimated apertures 16A, 16B, 16C. The spot size viewed is provided such that the weld width and the uncertainty in aiming of the detector 10 is accommodated. An inlet 18 to the apertures 16A, 16B, 16C labeled LIGHT is designed to not obscure the narrow field of view and to shield the first aperture from splatter. A length of the limiting apertures between the apertures 16A and 16B is indicated by an arrow labeled A. A gas inlet (not shown) may be provided between two of the apertures, such as apertures 16A and 16B to allow the addition of clean purge gas to keep the sensor window clean. Visual aiming of the detector 10 can be performed using a gunsight tab 20 as shown. Also improved aiming accuracy can be provided using laser beams.

The design of detector 10 provides aiming and field of view in a rugged compact package. In operation, the detector 10 is passive, requiring no external power sources. For detection in the near infrared bandwidth and hostile environments fiberoptics may be used such that the photodiode 14 can be placed in a remote location. A removable plug 22 is shown at an opposite end of the IR detector 10 from the light inlet 18 near the photodiode 14.

The IR photodiode 14 having an appropriate responsivity is selected for the sensor 10 based on the temperature of the molten material of the weld pool 12. For example, for iron with a melting point of 1535° C., the peak emission wavelength is around 1 μm and the appropriate IR photodiode 14 is an indium gallium arsenide (InGaAs) photodiode. Other photodiodes can be used, but a filter (not shown) may be required and can be easily incorporated in the current design of detector 10. Detector provides for easy replacement of the sensor and a standard connector such as BNC can be added for ease in hookup.

The illustrated design of IR detection 10 is arranged for easy mounting onto an available processing optics assembly (not shown). The detector 10 is located at a predetermined location, for example, 6 inches or further away from the weld pool 12 to minimize splatter. An optimal distance typically will depend on the field of view of the detector 10 and the noise level of the detection circuitry.

Referring to FIG. 3A, an output signal of the weld monitoring detector 10 is applied to a digital signal processor (DSP) 30 that has an associated memory 32. A display driver 34 operatively controlled by the DSP 30 provides a display signal to a display 36 that can be viewed by a user of the weld monitoring detector 10. An alarm 38 is coupled to the DSP 30 for generating an alarm, such as an audible signal to alert the user of the weld monitoring detector 10.

Figure 3B:
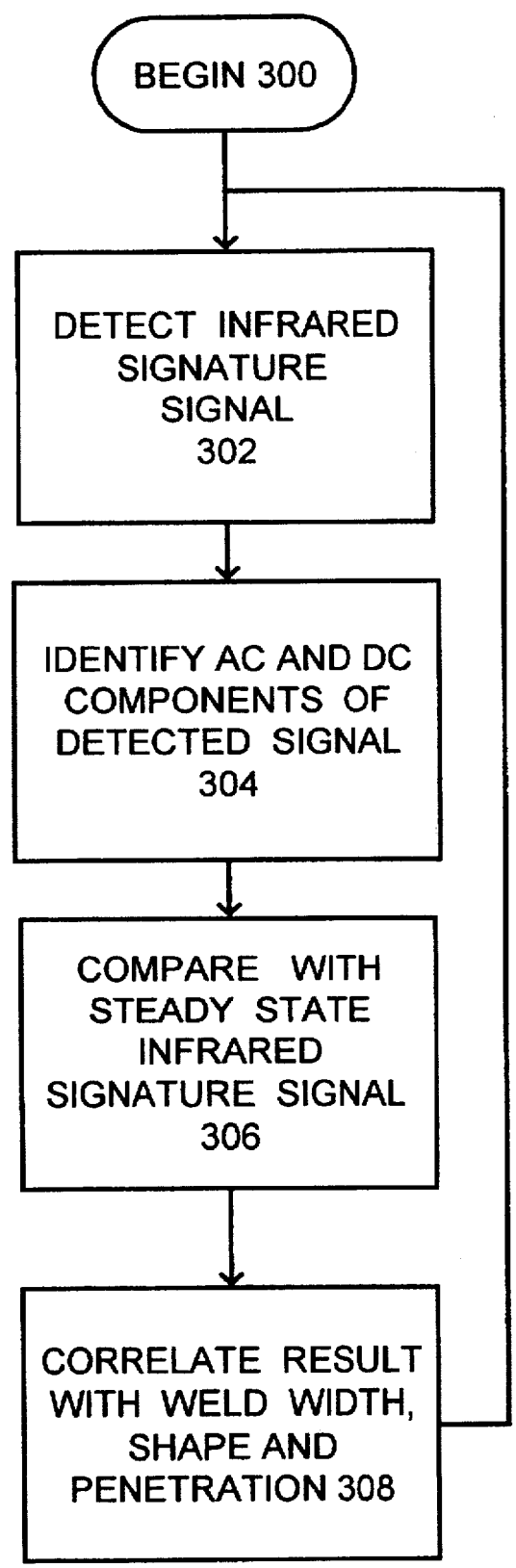
FIG. 3B is a flow chart illustrating sequential functions performed by the monitoring system of FIG. 3A.

Referring to FIG. 3B, sequential functions performed by the DSP 30 are shown beginning at a block 300. The infrared signature signal is detected as indicated at a block 302. Then the AC and DC components of the detected signal are identified as indicated at a block 304. The detected infrared signature signal that includes the identified AC and DC components of the detected signal, is compared with a steady state infrared signature signal of the weld pool 12 as indicated at a block 306. Then the compared results are correlated to identify a weld width, shape and penetration as indicated at a block 308. The compared results with respect to the DC component of the detected signal are correlated to identify the weld penetration at block 308. The compared results with respect to the AC component of the detected signal are correlated to identify the weld width and shape at block 308.

In FIGS. 4–11, an output signal (left vertical axis) is shown relative to time (horizontal axis). A temperature reference is provided relative to the right vertical axis of the plots of FIGS. 4–7. The voltage output signal of the detector 10 is illustrated by a line labeled IR for comparison with UV and pyrometer signals illustrated by lines labeled UV and PYRO. FIGS. 4 to 7 illustrate resulting output signals from the detector 10 for comparing the detector output signal from a good weld in FIGS. 4 and 5 to the detector output signal from welds which were not as good in FIGS. 6 and 7. The sequence of plots are shown in FIGS. 4–7 for progressively less ideal welds.

Figure 4:
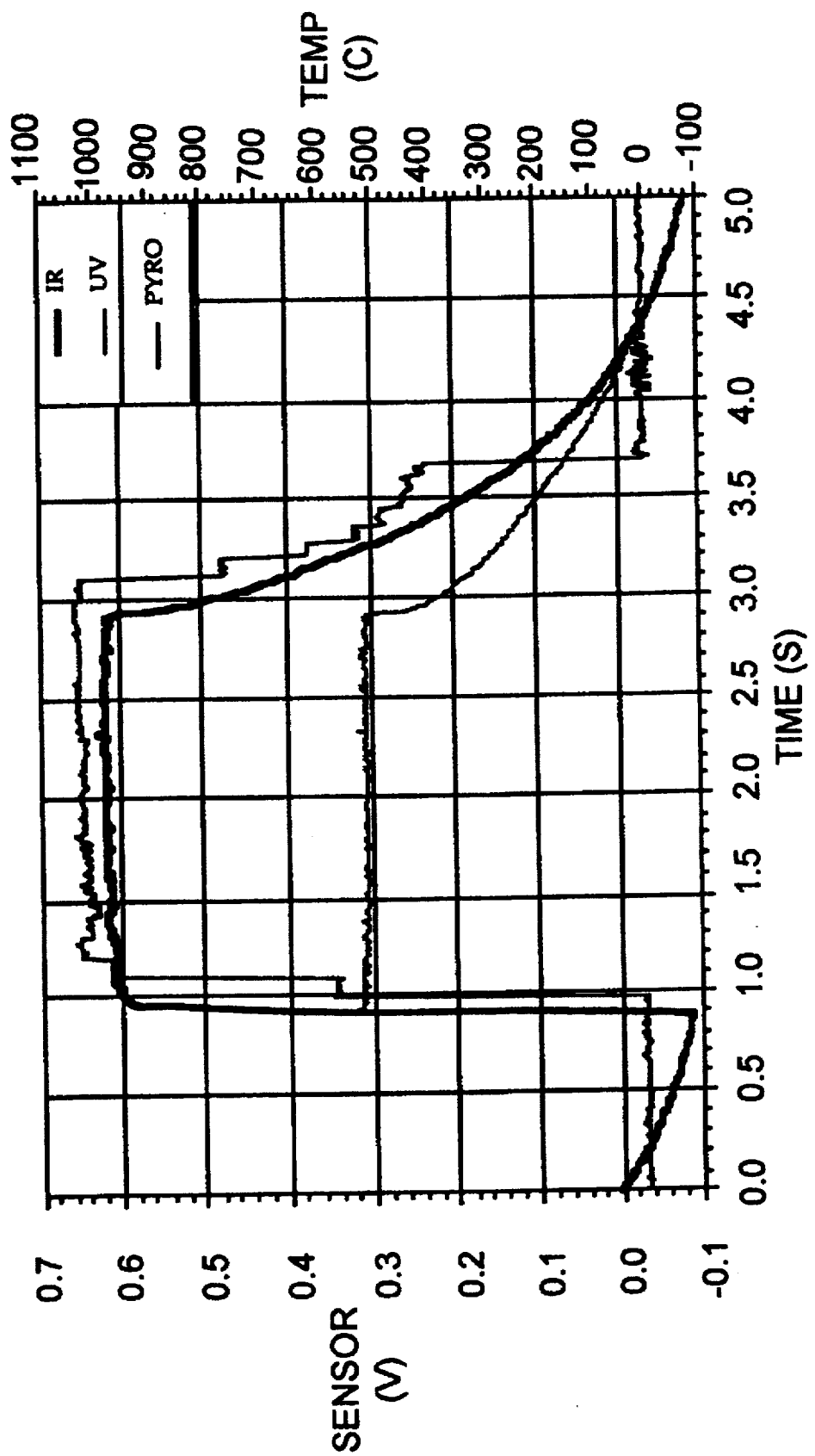
FIGS. 4–11 are charts illustrating operations of the monitoring system of FIG. 3A including the detector of FIG. 1 in accordance with the present invention.

FIG. 4 illustrates the case of a good lap weld with full penetration characterized by relatively constant response from each sensor. Note that the pyrometer output signal had a relatively long characteristic response time of 200 ms. The temperature tended to increase gradually with time as the plate absorbed the energy from the laser beam. The long tails or decay portions of the plotted outputs should be ignored. The tails were caused by the circuit capacitance that has been essentially eliminated for the latest version or caused by the cooling of the edge of the weld pool 12.

Figure 5:
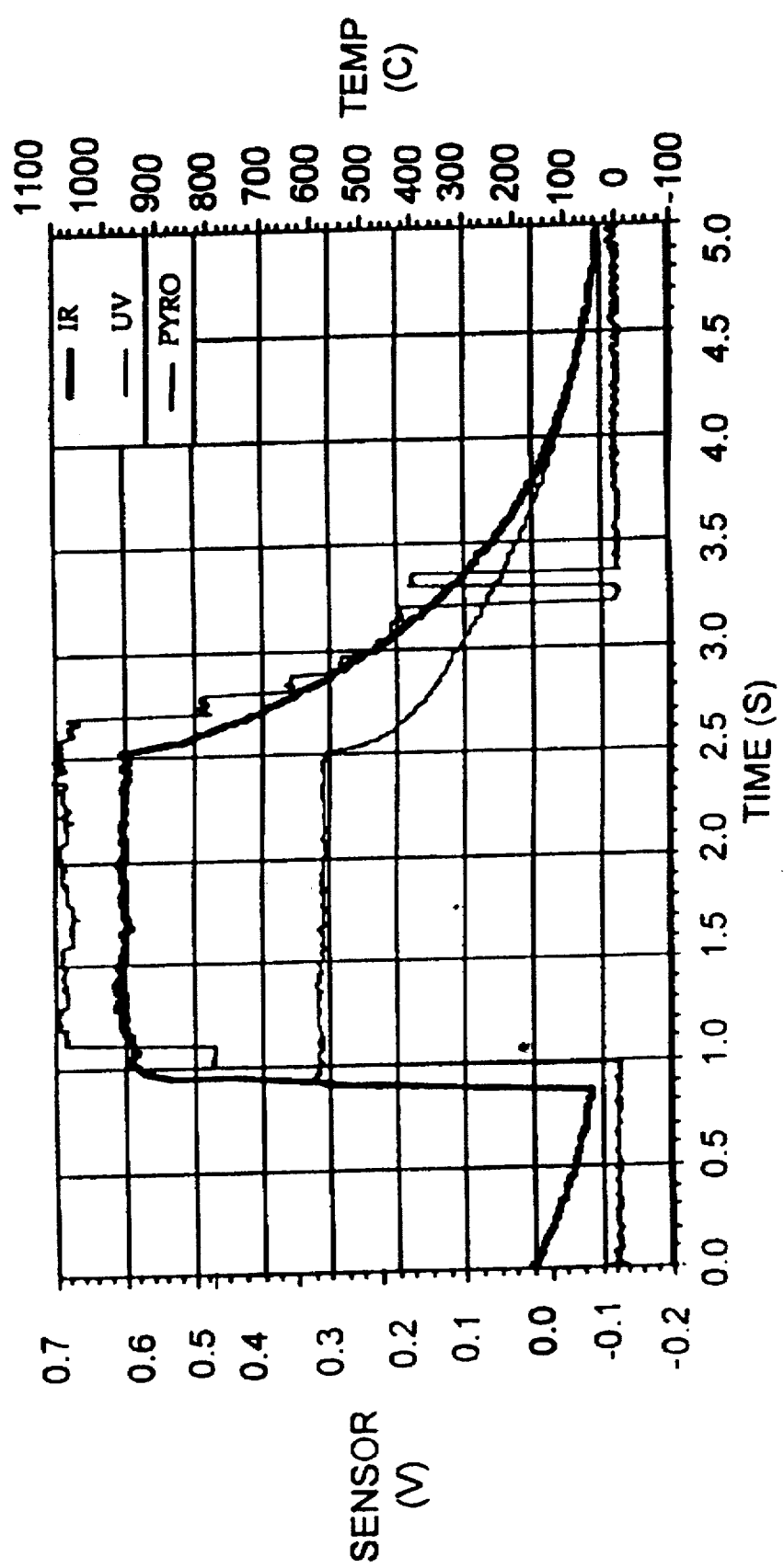

FIG. 5 illustrates a partial penetration weld with variations in penetration. The outputs of the sensors have slightly more variability than in FIG. 4. The IR sensor output has slightly lower values whereas the UV sensor output is essentially the same as in the previous case.

Figure 6:
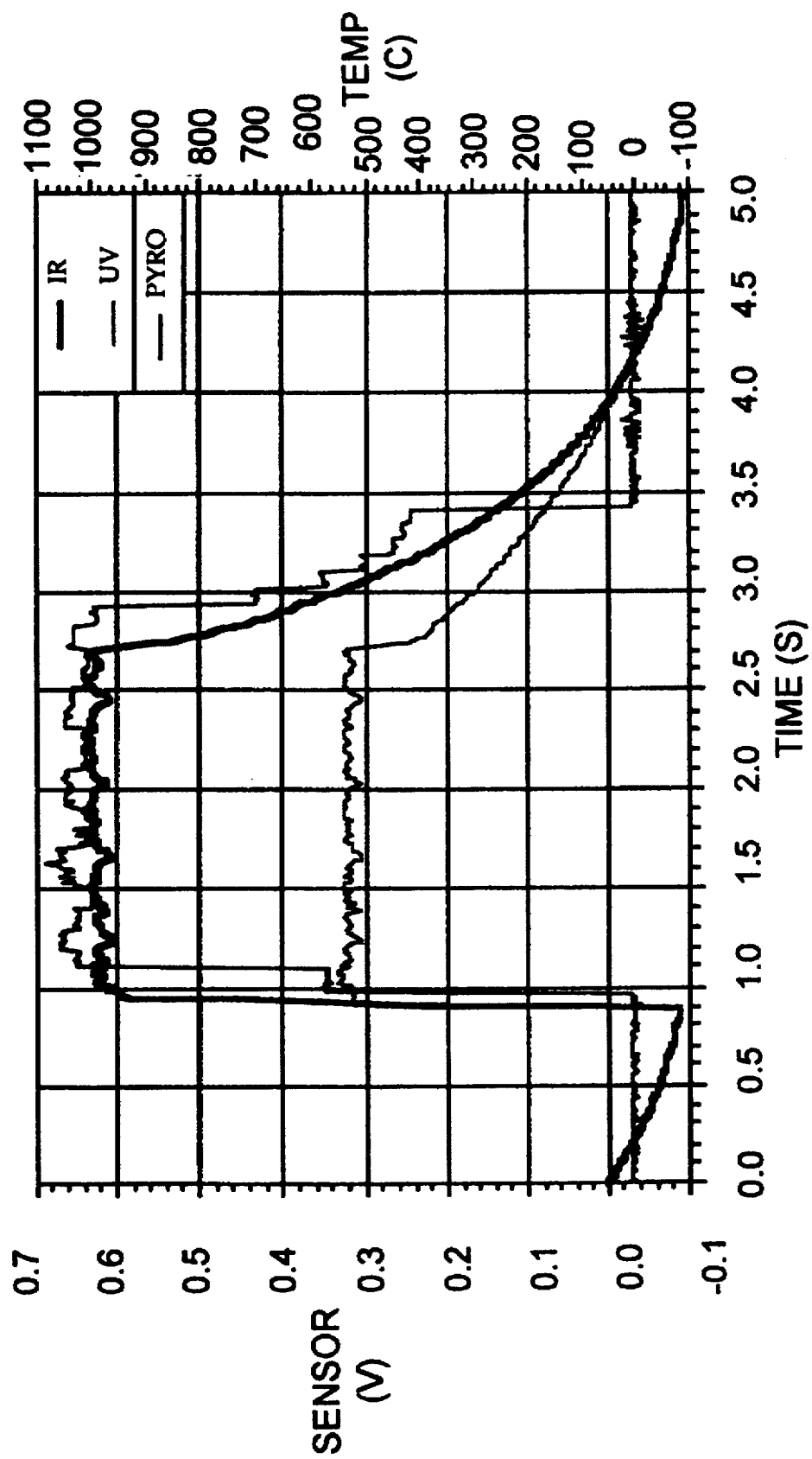

FIG. 6 illustrates a varying partial penetration weld with some humping. The outputs here have increased variability. The responses of the UV and IR sensors correlate well whereas the pyrometer output has an inverse correlation. This temperature change is not unexpected for a surface that protrudes from the weld pool and subject to increased cooling.

Figure 7:
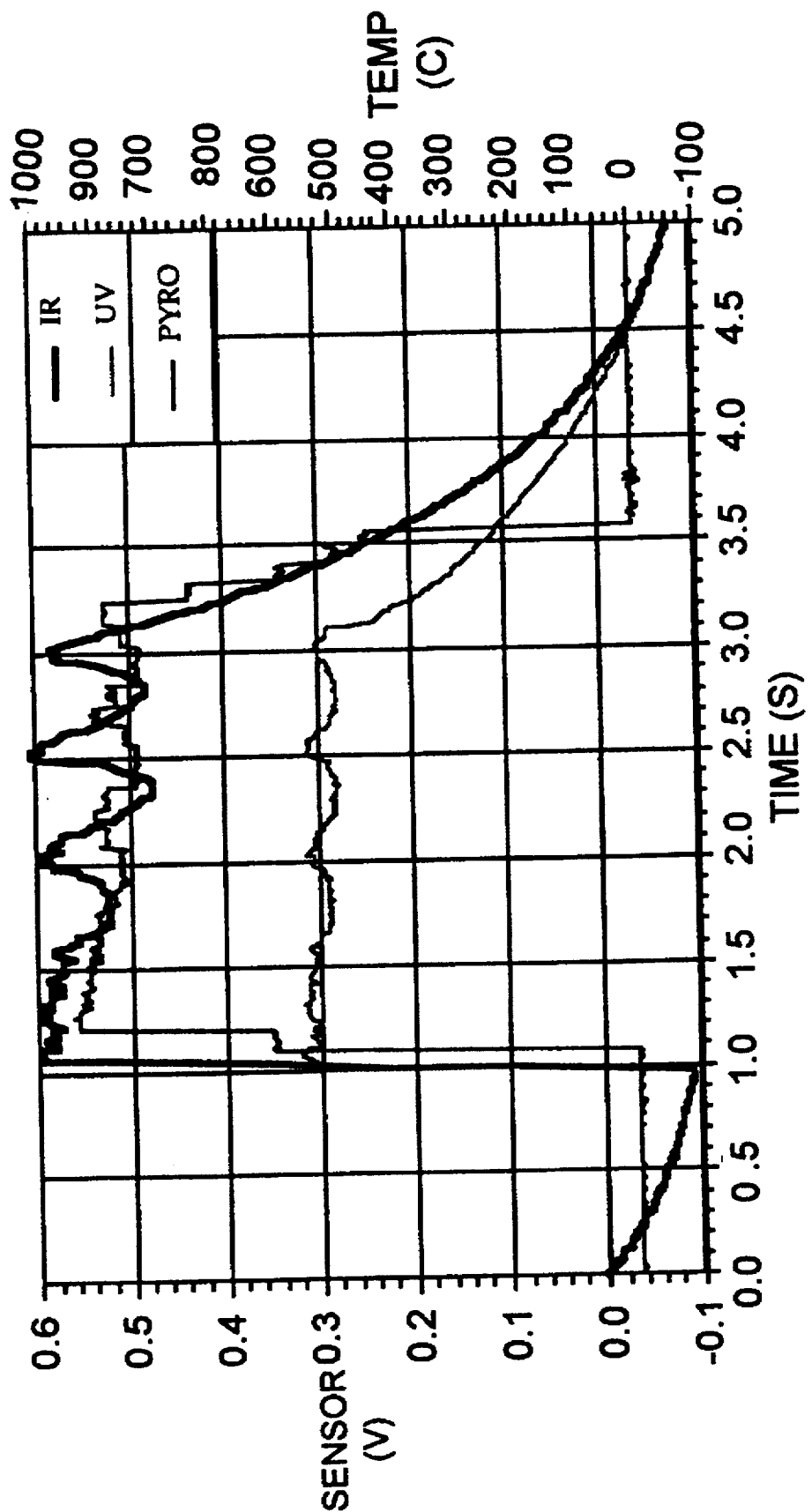

FIG. 7 illustrates a varying partial penetration weld with severe humping. The outputs of the sensors have the same correlation characteristics as in FIG. 6. The IR sensor 10 is the most sensitive to the degree of the humping.

The data indicates that the output of a UV photodetector tends to track that of the IR detector 10 for most weld conditions. For example, the output of both detectors oscillated when humping of the weld occurred. Decrease in beam power would result in decrease output of the detectors. However, the IR detector 10 was found to be substantially more sensitive to weld surface and possibly penetration changes than the UV detector. The temperature readings obtained with the pyrometer correlated inversely with the IR photodiode response for the case of humping while no good correlation was obtained for other surface changes. Most pyrometers have a significant response time that may prevent full data acquisition. Hence, the data obtained confirm the expectation that IR detection is a more direct and sensitive indicator of the weld surface geometry.

Figure 8:
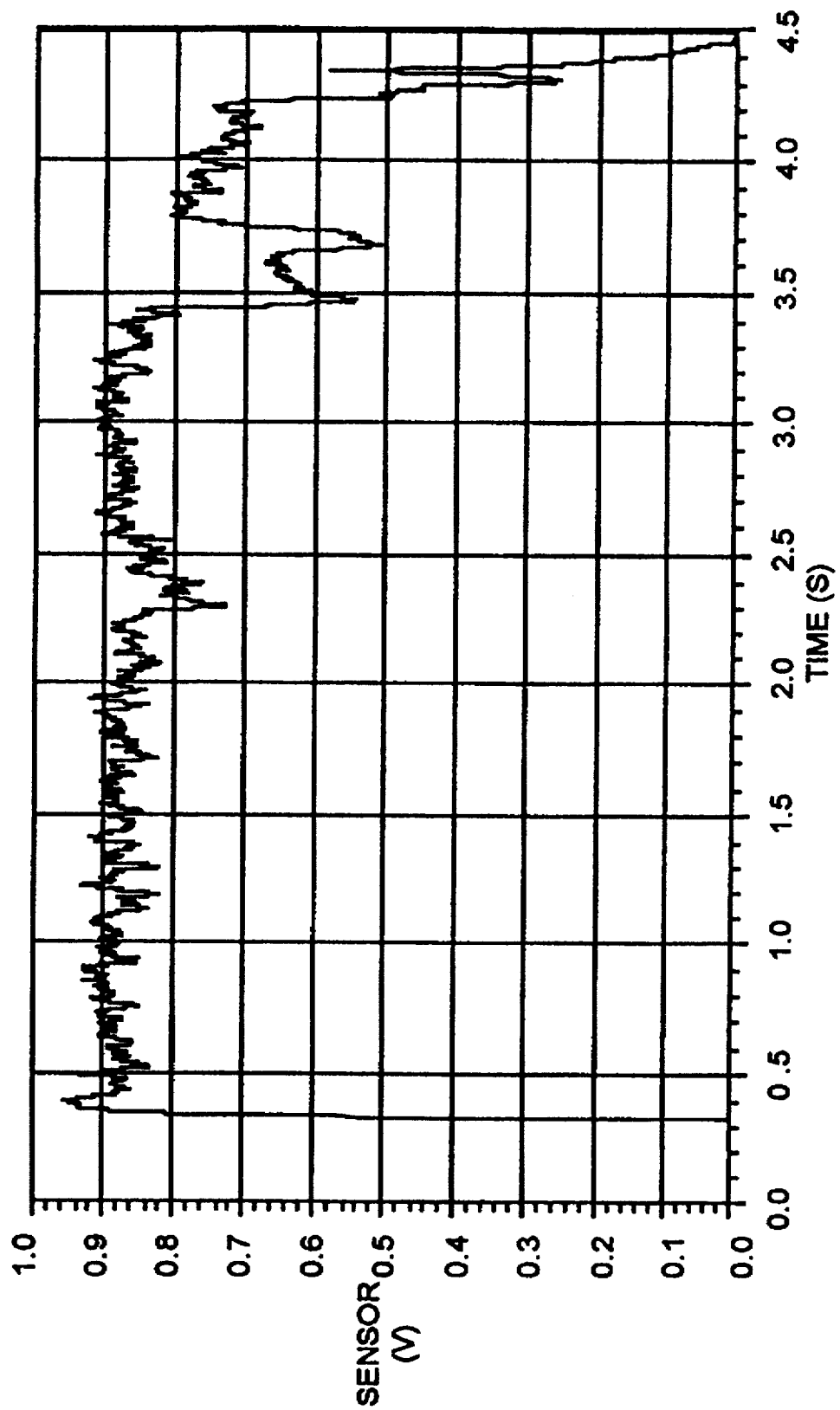
Figure 9:
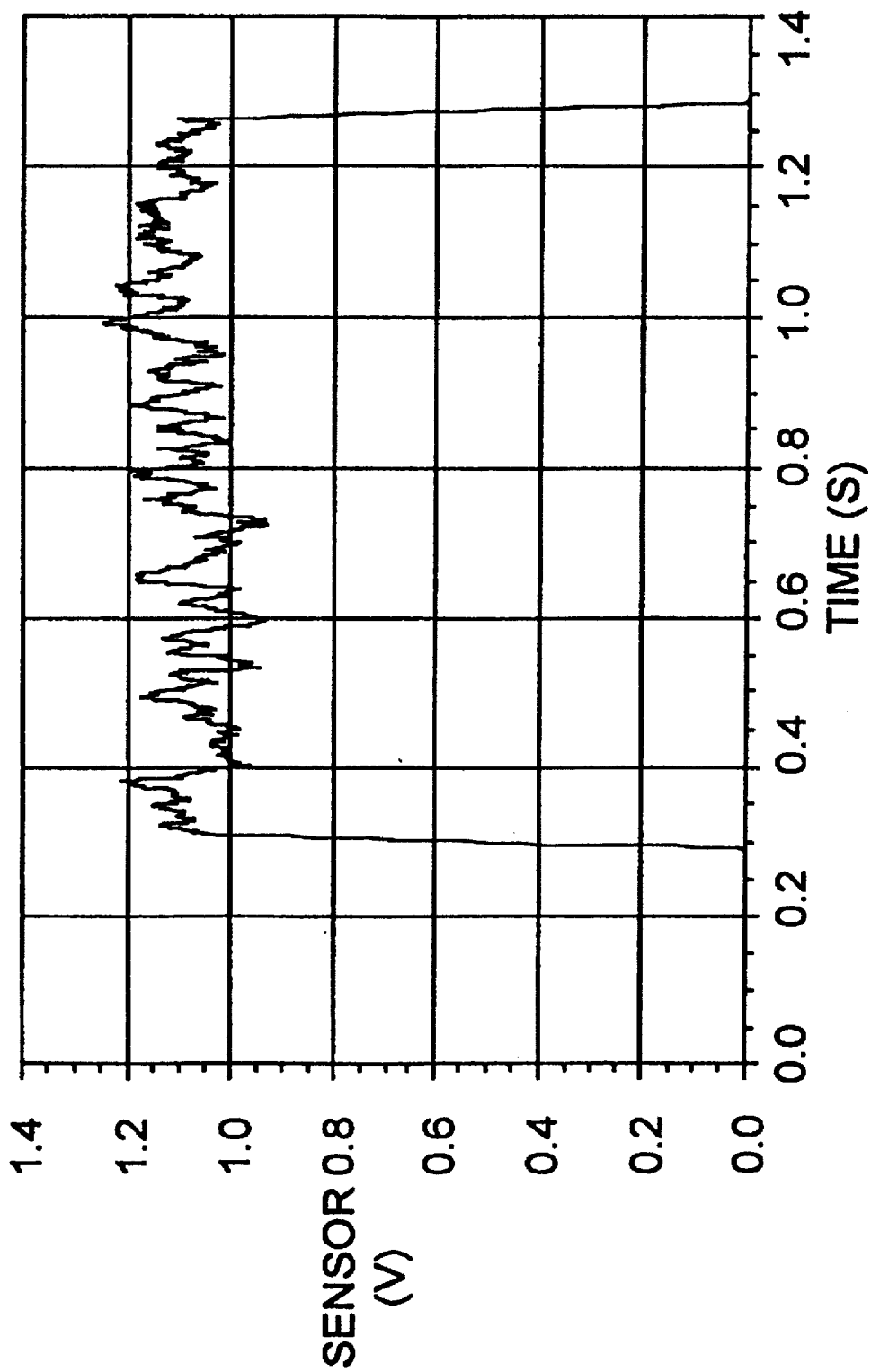

In FIGS. 8 and 9, the response of the weld monitoring IR detector 10 to changes in weld width and surface features are illustrated. FIG. 8 shows a response of the weld monitor 10 for the length of the weld for lap welding aluminum bearing stainless steel (SR12). The voltage plotted is the output of the IR detector 10 amplified by a factor of 10 and filtered at 50 Hz. Weld defects were simulated by changing the workpiece geometry, for example, gap between plates, and changing the air gap between the top and bottom plates by using 304 SS slim stock between the plates on the right hand side. The beam power was kept constant (±5%). A lap weld with a relatively good surface geometry is characterized by a relatively constant DC voltage output from the detector 10. The fluctuations of the signal frequencies >10 Hz were primarily from the digitization noise in the data acquisition system, other electronic noise present and normal fluctuations in emissions from the weld pool. The drop in the DC level of the signal at about 2.3 seconds was caused by the weld dropout at the gap between the two sets of plates that were butted together. The detector signal output returns to the previous level after the "gap" defect. The presence of an air gap caused by the shimming affected the weld because of the molten pool dropping into the air gap resulting in a decrease in the weld width. A corresponding large drop in the detector output was obtained. The weld that was formed over the shim stock had an increasing undercut and a surface lower than the top of the bare material. A decreasing voltage output from the detector was obtained. In other tests a large AC component of the detector output was obtained under conditions of humping with the peak output corresponding to the humped surface and the minimum to depressed surface. Other tests also showed that the detector responded well to changes in the weld surface. It should be noted that the temperature of the weld pool also varied for the conditions measured and the responses of the detector were the result of the combined surface and temperature changes.

Figure 10:
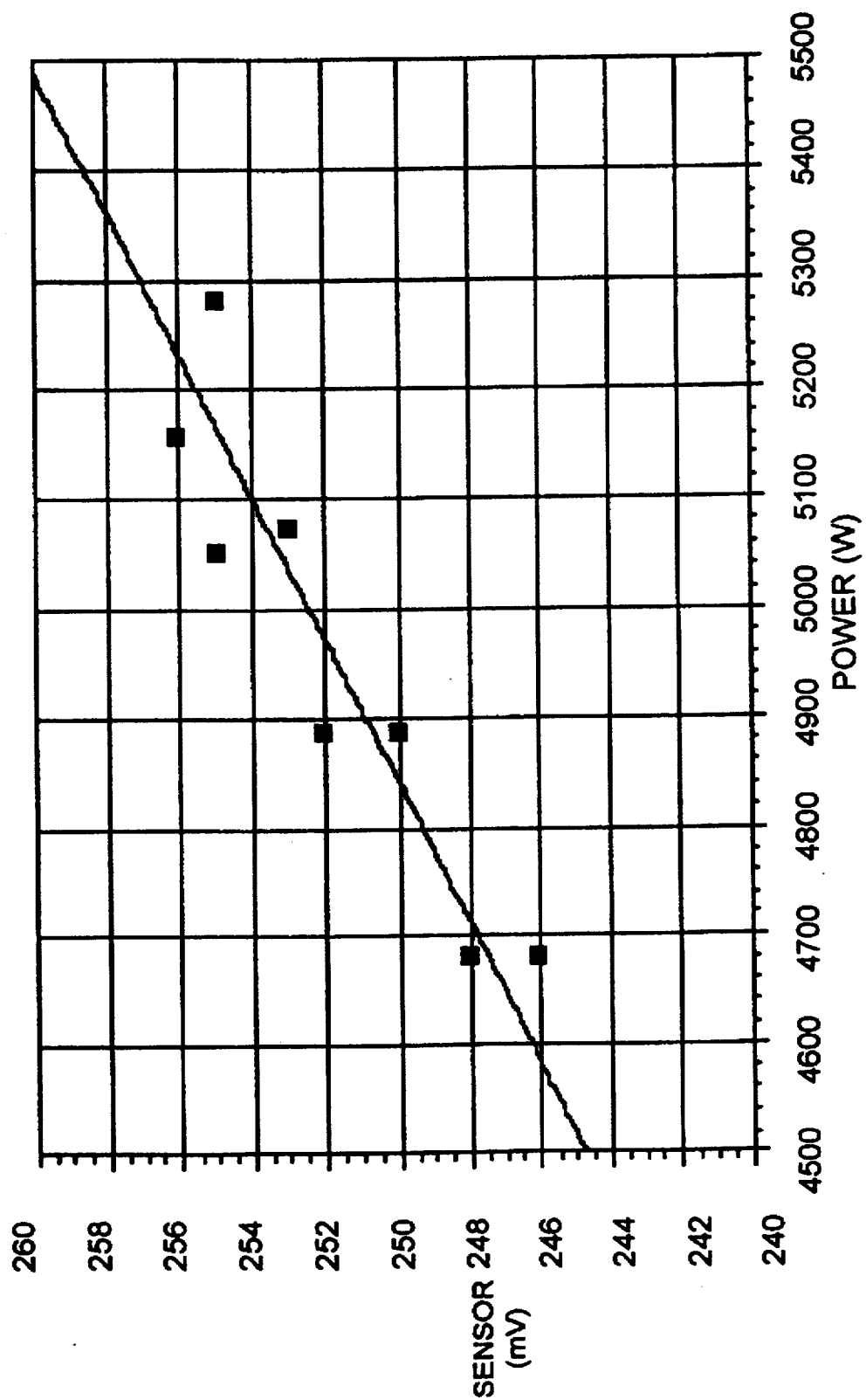
Figure 11:
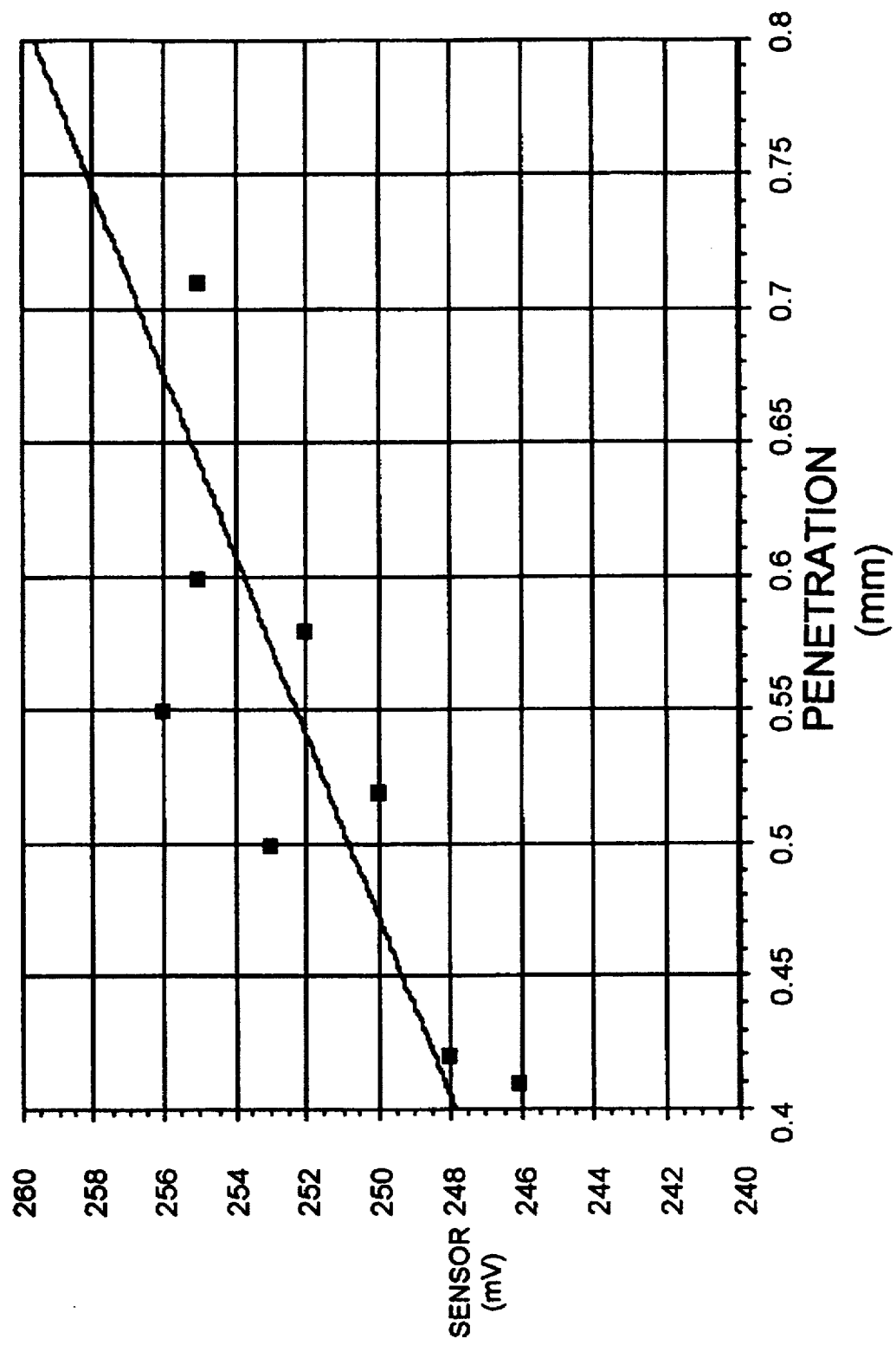

Referring to FIGS. 10 and 11, the response of the IR detector 10 to changes in weld penetration was tested using lap welds of 1018 steel on 1045 steel. Two types of steel were used because of availability and were not expected to be a factor in the tests. The power was varied with the weld speed kept constant to determine the change in the detector output. The changes in beam power used (4680–5160W) simulated power fluctuations in the output of the laser or contamination of the optics caused by splatter. The response of the weld monitor to power is shown in FIG. 10. The output voltage for this case was obtained with a version of the weld monitor that had a wider field of view than previously used. The output voltage has a good linear correlation with power. The output of the detector is plotted as a function of the weld penetration in FIG. 11. The data has more variability than in FIG. 10 but still indicates a linear response. Note that the output voltage change was only 10 mv which is not a good signal to noise level. Improved response can be expected by using a larger field of view of the weld monitor and improving the digitization and electronic noise.

Although the present specification describes the use of the weld monitoring detector 10 with laser beam welding, it should be understood that the method of the invention is equally applicable to other types of welding.

While the present invention has been described with reference to the details of the embodiments of the invention shown in the drawing, these details are not intended to limit the scope of the invention as claimed in the appended claims.

What is claimed is:

1. A method for real time weld monitoring comprising the steps of:
   detecting an infrared (IR) signature emitted by a hot weld surface during welding;
   comparing said detected infrared signature with an infrared signature emitted by the weld surface during steady state conditions; and
   correlating said compared values with the penetration of the weld; and wherein said step of detecting said infrared signature includes the steps of detecting change in the direct current component of a detected signal responsive to said emitted infrared signature; said direct current component used in said comparing and correlating steps to identify weld penetration.

2. A method for real time weld monitoring comprising the steps of:
   detecting an infrared signature emitted by a hot weld surface during welding;
   comparing said detected infrared signature with an infrared signature emitted by the weld surface during steady state conditions; and
   correlating said compared Values with the penetration of the weld; and detecting change in the alternating current component of a detected signal responsive to said emitted infrared signature, and utilizing said detected change in the alternating current component of the detected signal for correlating with the weld width and weld shape.

3. A method for real time weld monitoring as recited in claim 2 wherein said step of detecting said infrared signature includes the steps of providing an infrared detecting apparatus at a selected position relative to the weld.

4. A method for real time weld monitoring as recited in claim 3 wherein said infrared detecting apparatus is provided at a selected position above the weld.

5. An apparatus for real time weld monitoring comprising:

means for detecting an infrared signature emitted by a hot weld surface during welding;

means for comparing said detected infrared signature with an infrared signature emitted by the weld surface during steady state conditions;

means for correlating said compared values with the penetration of the weld;

means for detecting change in the alternating current component of a detected signal responsive to said emitted infrared signature; and means utilizing said detected change in the alternating current component of the detected signal for correlating with the weld width and weld shape.

6. An apparatus for real time weld monitoring as recited in claim 5 further include means for generating an alarm signal related to said detected infrared signature.

7. An apparatus for real time weld monitoring as recited in claim 6 wherein said means for detecting said infrared signature include detecting means responsive to said infrared emissions; means for restricting a field of view of said IR emissions responsive detecting means and means for aims said IR emissions responsive detecting means.

8. An apparatus for real time weld monitoring as recited in claim 6 wherein said comparing means and said correlating means comprise a digital signal processing unit.

9. An apparatus for real time weld monitoring as recited in claim 6 further include means for displaying a signal related to said detected infrared signature.

\* \* \* \* \*